United States Patent
Ono et al.

(10) Patent No.: US 7,985,289 B2
(45) Date of Patent: Jul. 26, 2011

(54) ULTRAFINE BARIUM SULFATE PARTICLE, WATER-BASED COATING COMPOSITION, AND WATER-BASED INK COMPOSITION

(75) Inventors: Keiji Ono, Fukushima (JP); Hiroyuki Izumikawa, Fukushima (JP); Hirobumi Yoshida, Fukushima (JP)

(73) Assignee: Sakai Chemical Industry., Ltd., Osaka (JP)

( * ) Notice: Subject to any disclaimer, the term of this patent is extended or adjusted under 35 U.S.C. 154(b) by 405 days.

(21) Appl. No.: 12/086,564

(22) PCT Filed: May 18, 2006

(86) PCT No.: PCT/JP2006/309898
§ 371 (c)(1),
(2), (4) Date: Aug. 6, 2008

(87) PCT Pub. No.: WO2007/069353
PCT Pub. Date: Jun. 21, 2007

(65) Prior Publication Data
US 2010/0162922 A1 Jul. 1, 2010

(30) Foreign Application Priority Data
Dec. 16, 2005 (JP) ................. 2005-364073

(51) Int. Cl.
*C09D 11/00* (2006.01)
(52) U.S. Cl. .................................. 106/31.6
(58) Field of Classification Search ............ 106/31.6
See application file for complete search history.

(56) References Cited

U.S. PATENT DOCUMENTS

| | | | |
|---|---|---|---|
| 3,840,381 A * | 10/1974 | Watanabe | 106/415 |
| 4,170,669 A | 10/1979 | Okada | |
| 4,505,755 A | 3/1985 | Shinozuka et al. | |
| 4,551,497 A | 11/1985 | Shinozuka et al. | |
| 6,866,711 B2 * | 3/2005 | Sinclair et al. | 106/461 |
| 2004/0182282 A1 | 9/2004 | Yamazaki et al. | |
| 2009/0060960 A1 | 3/2009 | Biehl et al. | |

FOREIGN PATENT DOCUMENTS

| | | | |
|---|---|---|---|
| GB | 2134094 A * | 8/1984 | |
| JP | 47-31898 | 12/1972 | |
| JP | 57-145031 | 9/1982 | |
| JP | 58-120520 | 7/1983 | |
| JP | 59-090671 | 5/1984 | |

(Continued)

*Primary Examiner* — Jerry Lorengo
*Assistant Examiner* — Veronica Faison Gee
(74) *Attorney, Agent, or Firm* — Jordan and Hamburg LLP

(57) ABSTRACT

The present invention provides an ultrafine barium sulfate particle, which improves, even if the particle is mixed in a water-borne composition, such as a water-borne coating composition or a water-borne ink composition, color saturation and gloss of color pigments, such as carbon black, or improve orientation of aluminum flakes or pearl pigments, which have been used in metallic coating compositions. The present invention also provides a water-borne coating composition and a water-borne ink composition, which contain the ultrafine barium sulfate particle. The present invention provides an ultrafine barium sulfate particle, comprising barium sulfate; and (1) a hydroxide and/or an oxide of at least one metallic element selected from the group consisting of Al, Si and Zr; and/or (2) a phosphate of at least one metallic element selected from the group consisting of Mg, Ca, Sr and Ba; the barium sulfate being coated with the hydroxide and/or oxide (1) and/or the phosphate (2).

5 Claims, 3 Drawing Sheets

FOREIGN PATENT DOCUMENTS

| | | |
|---|---|---|
| JP | 59-122553 | 7/1984 |
| JP | 59-122554 | 7/1984 |
| JP | 60-79074 | 5/1985 |
| JP | 2-83211 | 3/1990 |
| JP | 5-163447 | 6/1993 |
| JP | 9-87587 | 3/1997 |
| JP | 9-156924 | 6/1997 |
| WO | WO-93/22386 | 11/1993 |
| WO | WO-2007/009887 | 1/2007 |

* cited by examiner

Figure 3 - Table 2

| | Ultrafine barium sulfate particle | | Pigment | Organic solvent | 20°-20° | Transparency % | Color development L | Color development a | Color development b |
|---|---|---|---|---|---|---|---|---|---|
| | Type | parts by mass | | | | | | | |
| Ex. 13 | Ex. 1 | 50 | None | | 122 | 94 | — | — | — |
| Ex. 14 | Ex. 2 | 50 | None | | 100 | 90 | — | — | — |
| Ex. 15 | Ex. 3 | 50 | None | | 113 | 92 | — | — | — |
| Ex. 16 | Ex. 4 | 50 | None | | 110 | 90 | — | — | — |
| Ex. 17 | Ex. 5 | 50 | None | | 108 | 90 | — | — | — |
| Ex. 18 | Ex. 6 | 50 | None | | 105 | 89 | — | — | — |
| Ex. 19 | Ex. 7 | 50 | None | | 105 | 89 | — | — | — |
| Ex. 20 | Ex. 8 | 50 | None | | 110 | 91 | — | — | — |
| Ex. 21 | Ex. 9 | 50 | None | | 89 | 87 | — | — | — |
| Com. Ex. 1 | BARIFINE BF-20 | 50 | None | | 66 | 85 | — | — | — |
| Ex. 22 | Ex. 10 | 50 | None | Propylene glycol | 89 | 92 | — | — | — |
| Ex. 23 | Ex. 11 | 50 | None | | 85 | 90 | — | — | — |
| Ex. 24 | Ex. 12 | 50 | None | | 84 | 90 | — | — | — |
| Com. Ex. 2 | BARIFINE BF-20 | 50 | None | | 78 | 88 | — | — | — |
| Ex. 25 | Ex. 1 | 6 | Black pigment | Butyl cellosolve | 90 | — | 6.8 | 0.0 | 0.0 |
| Ex. 26 | Ex. 2 | 6 | | | 87 | — | 6.8 | 0.0 | 0.0 |
| Ex. 27 | Ex. 3 | 6 | | | 87 | — | 6.9 | 0.0 | 0.0 |
| Com. Ex. 3 | Ex. 9 | 6 | | | 85 | — | 7.0 | 0.0 | 0.0 |
| Com. Ex. 4 | BARIFINE BF-20 | None | | | 83 | — | 7.2 | 0.9 | 0.0 |
| | | | | | 81 | — | 7.1 | 0.0 | 0.0 |
| Ex. 28 | Ex. 4 | 20 | Red pigment | Propylene glycol | 74 | — | 25.2 | 40.9 | 13.2 |
| Ex. 29 | Ex. 5 | 20 | | | 72 | — | 25.2 | 40.9 | 13.1 |
| Ex. 30 | Ex. 6 | 20 | | | 71 | — | 25.2 | 40.8 | 13.2 |
| Ex. 31 | Ex. 7 | 20 | | | 71 | — | 25.1 | 40.8 | 13.2 |
| Ex. 32 | Ex. 8 | 20 | | | 74 | — | 25.1 | 40.8 | 13.1 |
| Com. Ex. 5 | BARIFINE BF-20 | 20 | | | 41 | — | 24.8 | 39.7 | 12.7 |
| Com. Ex. 6 | None | | | | 63 | — | 24.9 | 40.6 | 13.2 |
| Ex. 34 | Ex. 10 | 6 | Black pigment | Butyl cellosolve | 81 | — | 6.8 | 0.0 | 0.0 |
| Ex. 35 | Ex. 11 | 6 | | | 78 | — | 6.9 | 0.0 | 0.0 |
| Ex. 36 | Ex. 12 | 6 | | | 78 | — | 6.9 | 0.0 | 0.0 |
| Com. Ex. 7 | BARIFINE BF-20 | 6 | | | 77 | — | 7.2 | 0.1 | 0.1 |
| Com. Ex. 8 | None | | | | 55 | — | 7.0 | 0.0 | 0.0 |
| Ex. 27 (Ink) | Ex. 1 | 20 | Black pigment | Ethylene glycol | 85 | — | 6.2 | 0.0 | 0.0 |
| Com. Ex. 9 | None | | | | 74 | — | 6.4 | 0.0 | 0.0 |

Coating composition / Ink composition

ULTRAFINE BARIUM SULFATE PARTICLE, WATER-BASED COATING COMPOSITION, AND WATER-BASED INK COMPOSITION

FIELD OF THE INVENTION

The present invention relates to an ultrafine barium sulfate particle, a water-borne coating composition, and a water-borne ink composition.

BACKGROUND ART

In recent years, water-borne coating compositions and water-borne ink compositions that contains only extremely low amount of organic solvents are widely used in the fields of coating compositions and ink compositions as a measure for preventing pollution. In Europe, effluent control of VOC has been under enforcement for a long time. Therefore, shift to water-borne coating compositions or water-borne ink compositions from solvent-borne coating compositions or solvent-borne ink compositions will be accelerated from now on. In order to attend to such needs for water-borne systems, it has been desired to incorporate various compounds, which have been used in a solvent-borne coating composition and a solvent-borne ink composition so far, in a water-borne coating composition or a water-borne ink composition without any property deterioration.

As one example of such compounds that has been demanded to use in water-borne coating compositions or water-borne ink compositions, ultrafine barium sulfate particles can be mentioned. Ultrafine barium sulfate particles mixed in solvent-borne coating compositions or solvent-borne ink compositions improve color saturation and gloss of color pigments, such as carbon black, or improve orientation of aluminum flakes or pearl pigments, which have been used in metallic coating compositions (See the below Patent Documents 1 to 3).

However, barium sulfate originally has low affinity for resins. Thus, for incorporating in solvent-borne coating compositions or ink compositions, the surface of barium sulfate has conventionally been treated with an alkali, so that pigment pH value of the barium sulfate should be 9 or higher (See the below Patent Document 4). Barium sulfate is not sufficiently dispersed in water-borne coating compositions or water-borne ink compositions, and has low affinity for resins for water-borne coating compositions or water-borne ink compositions. Thus, if ultrafine barium sulfate particles alone are mixed with a resin, the resultant coated film shows insufficient transparency and insufficient gloss. Water-borne coating compositions or water-borne ink compositions that contain such ultrafine barium sulfate particles show insufficient improvement of color saturation and gloss of colored pigments, such as carbon black, or insufficient improvement of orientation of aluminum flakes or pearl pigments, which have been used in metallic coating compositions.

A treatment by an organic phosphorous compound is disclosed in the below Patent Documents 5, as an example of ways to treat the surface of an ultrafine barium sulfate particle with an average primary particle diameter of 0.10 μm or less. However, the surface treatment is not for water-borne coating compositions, water-borne ink compositions or the like, but for a treatment to improve the affinity of the ultrafine barium sulfate particle with solvent-borne compositions.
[Patent documents 1] JP 60-79074, A
[Patent documents 2] JP 59-90671, A
[Patent documents 3] JP 5-163447, A
[Patent documents 4] JP 58-120520, A
[Patent documents 5] JP 9-156924, A

SUMMARY OF THE INVENTION

In view of the above state of the art, one object of the present invention is to provide an ultrafine barium sulfate particle, which improves, even if the particle is mixed in a water-borne composition, such as a water-borne coating composition or a water-borne ink composition, color saturation and gloss of color pigments, such as carbon black, or improves orientation of aluminum flakes or pearl pigments, which have been used in metallic coating compositions. Another object of the present invention is to provide a water-borne coating composition and water-borne ink composition, which contain the ultrafine barium sulfate particle.

One aspect of the present invention is an ultrafine barium sulfate particle, comprising
barium sulfate; and
(1) a hydroxide and/or an oxide of at least one metallic element selected from the group consisting of Al, Si and Zr; and/or (2) a phosphate of at least one metallic element selected from the group consisting of Mg, Ca, Sr and Ba. The barium sulfate is coated with the hydroxide and/or oxide (1) and/or the phosphate (2).

The ultrafine barium sulfate particle is preferably for a water-borne coating composition or a water-borne ink composition.

The amount of the component (1) and/or the component (2) on the barium sulfate is preferably 0.5 to 20% by mass based on the total mass of the substrate ultrafine barium sulfate particle and the component (1) and/or the component (2).

Another aspect of the present invention is a water-borne coating composition comprising the ultrafine barium sulfate particle.

Still further aspect of the present invention is a water-borne ink composition comprising the ultrafine barium sulfate particle.

The present invention will be described in detail below.

The ultrafine barium sulfate particle of the present invention has a surface coated with the specific compound mentioned above. Such surface of the particle improves dispersibility in water to be sufficient level and improves affinity for a water-borne resin contained in a water-borne composition, such as a water-borne coating composition and a water-borne ink composition. Dispersibility in water may be evaluated by, at first, dispersing a test sample of the particle in water by ultrasonication, and comparing the sediment volume of the sample. The ultrafine barium sulfate particle of the present invention, which is coated with a hydroxide and/or an oxide of Si, is not easily settled, compared with an ultrafine barium sulfate particle without any surface treatments. This result shows that coating with a hydroxide and/or an oxide of Si improves dispersibility of the ultrafine barium sulfate particle in water.

Affinity for a water-borne resin may be evaluated from the amount of the resin adsorbed to the particle. The amount of the resin adsorbed to the particle is evaluated as follows. The test sample of the ultrafine barium sulfate particle is at first dispersed in a target water-borne resin, then the dispersion is centrifuged and the supernatant is removed. The sediment is diluted. A serious of these operations including centrifugal sedimentation, supernatant removal and dilution of sediment is repeated. Thus-obtained sediment is filtered and dried. The amount of the resin adsorbed to the particle is estimated from the ignition loss of the recovered sediment. When the ultrafine barium sulfate particle has a coating of a hydroxide and/or an oxide of Zr and Al, or a phosphate of at least one metallic element selected from the group consisting of Mg, Ca, Sr and Ba, the amount of the resin adsorbed to the particle becomes larger. This result shows that coating of such a hydroxide and/or an oxide, or a phosphate improves affinity for a water-borne resin.

Thus, coating with a hydroxide and/or an oxide of at least one metallic element selected from the group consisting of Al, Si and Zr, or a phosphate of at least one metallic element selected from the group consisting of Mg, Ca, Sr and Ba provides several properties that are demanded as an ultrafine barium sulfate particle for various water-borne compositions to barium sulfate. Coating of these hydroxides, oxides and/or phosphates improve the affinity of the ultrafine barium sulfate particle for various water-borne resins such as anionic resins or cationic resins. Thus, the ultrafine barium sulfate particle of the present invention is expected to provide various effects resulting from improved dispersibility, when it is dispersed in a water-borne composition. Especially, improvement in dispersibility enhances transparency and gloss. The effect is caused by coating with a hydroxide and/or an oxide of at least one metallic element selected from the group consisting of Al, Si and Zr, and/or a phosphate of at least one metallic element selected from the group consisting of Mg, Ca, Sr and Ba.

The ultrafine barium sulfate particle comprises barium sulfate, and/or (1) a hydroxide and/or an oxide of at least one metallic element selected from the group consisting of Al, Si and Zr; and/or (2) a phosphate of at least one metallic element selected from the group consisting of Mg, Ca, Sr and Ba. The barium sulfate is coated with hydroxide and/or oxide (1) and/or the phosphate (2).

The expression "and/or" in the phrase "a hydroxide and/or an oxide of at least one metallic element selected from the group consisting of Al, Si and Zr" means that the component (1) may be any of a hydroxide, an oxide, a mixture of a hydroxide and an oxide, or substances in a complex state of a hydroxide and an oxide. In many cases for coating the surface of a barium sulfate particle with a hydroxide and/or an oxide of Al, Si and Zr on a barium sulfate particle, compounds of at least one metallic element selected from the group consisting of Al, Si and Zr are coated on the surface of barium sulfate particles, and then optionally the particles are calcined. Such a way of coating often provides a coating in a complex state of hydroxide and oxide structure at a certain treating temperature. The ultrafine barium sulfate particle of the present invention includes an ultrafine barium sulfate particle having such a coating in a complex state of hydroxide and oxide structure.

Phosphate (2) of at least one metallic element selected from the group consisting of Mg, Ca, Sr and Ba are not particularly limited, and examples of phosphate (2) include water-refractory phosphates represented by the formulas $MHPO_4$, $M_3(PO_4)_2$, and $M_5(PO_4)_3OH$ (wherein M represents Mg, Ca, Sr and Ba). Phosphates of at least one metallic element selected from the group consisting of Mg, Ca, Sr and Ba are not common as compounds used for treating the surface of pigments. The phosphate (2), however, can be firmly coated on the above ultrafine barium sulfate particle, and can contribute to provide effects as mentioned above. Among the phosphates (2) of metallic elements, a phosphate represented by the formula $MHPO_4$ is preferred because such a phosphate provides the same effects as the component (1). In the case of barium phosphates, phosphates, such as $Ba_5(PO_4)_3OH$, may be generated in coating at a high pH condition. The phosphates as $Ba_5(PO_4)_3OH$ also provides the same effects as mentioned above when coated on the ultrafine barium sulfate particle.

The ultrafine barium sulfate particle of the present invention may be coated only with either one of the components (1) and (2), or may be coated with both of the components (1) and (2).

If two or more compounds are used for coating the ultrafine barium sulfate particle, the compounds may be coated as a mixture of two or more compounds, or each of the compounds may be sequentially coated.

The amount of the above component (1) and/or component (2) coated on the substrate ultrafine barium sulfate particle is preferably 0.5 to 20% by mass, more preferably 1 to 18% by mass, and still more preferably 1 to 15% by mass, based on the total amount of the substrate ultrafine barium sulfate particle and the component (1) and/or component (2). If the amount is less than 0.5% by mass, dispersibility or affinity for resins may be little improved. If the amount exceeds 20% by mass, aggregation of ultrafine barium sulfate particles may become remarkable, and dispersibility of the particles may become deteriorated. As a result, color saturation and gloss of color pigments, such as carbon black, or orientation of aluminum flakes or pearl pigments, which have been used in metallic coating compositions, may not be sufficiently improved.

The amount of the hydroxide and/or oxide (1) of at least one metallic element selected from the group consisting of Al, Si and Zr coated on the substrate is mass calculated by converting the amount of Al, Si and Zr components coated on the particle into the amount of corresponding metal oxides. Namely, even if part or whole of coated Al, Si and Zr components are not oxides, the amount is estimated as the amount of corresponding metal oxides.

The amount of the phosphate (2) of at least one metallic element selected from the group consisting of Mg, Ca, Sr and Ba coated on the substrate is mass calculated by converting the amount of P components coated on the particle into the amount of corresponding phosphate represented by the general formula $MHPO_4$. Namely, even if part or whole of coated phosphates is not a phosphate represented by the general formula $MHPO_4$, the amount is estimated as the amount of corresponding phosphate represented by the general formula $MHPO_4$.

If two or more of Mg, Ca, Sr, and Ba are coated, the ultrafine barium sulfate particle after the coating is analyzed by fluorescent X-ray analysis, and the amount of each metallic component is estimated. The estimated values of Mg, Ca, and Sr are calculated as the amounts of phosphates ($MgHPO_4$, $CaHPO_4$, $SrHPO_4$) in this order until the amounts balance the quantity of P component. If P component is left after the above calculation, the amount of the coated component is calculated as the amount of phosphate of Ba ($BaHPO_4$).

If the coated substances are constituted of the components (1) and (2), the coated amount is the total value of mass in the components (1) and (2) calculated by the above method for each component.

The above amount of component (1) and/or component (2) coated on the substrate ultrafine barium sulfate particle based on the total amount of the substrate and the coated substances may be determined from the amount of Al, Si, Zr and P components contained in the coated film. Such an amount of Al, Si, Zr and P components may be determined by known analytical methods, such as X-ray fluorescence analysis or a chemical analysis. For example, the amount of Al, Si and Zr components contained in a coated film on the ultrafine barium sulfate particle may be determined by X-ray fluorescence analysis. The amount of P components may be determined by a molybdenum blue method. That is, the coated substances are made melted with alkaline sodium carbonate under heating, the resulting aqueous solution of P components is separated, and then the amount of P components is determined. The way of determining the amounts of Al, Si, Zr and P components is not limited to the above examples.

The number average primary particle diameter of the ultrafine barium sulfate particle of the present invention is preferably 0.1 µm or smaller, and particularly preferably 0.06 µm or smaller. The above number average primary particle diameter is a number average value of a unidirectional particle diameter determined from a transmission electron micrograph. If the number average primary particle diameter exceeds 0.1 µm, transparency may be deteriorated because particles may scatter visible lights depending on the particle diameter. As a result, color saturation and gloss of color pigments, such as carbon black, or orientation of aluminum flakes or pearl pigments, which have been used in metallic coating compositions, may less improved. The above number average primary particle diameter is determined by taking 100,000× magnification transmission electron micrographs of random 300 sample particles with a transmission electron microscope, then measuring the unidirectional diameter of each particle, and calculating the average value of the diameters of the 300 particles.

The way to produce the ultrafine barium sulfate particle of the present invention is not particularly limited. For example, the ultrafine barium sulfate particle may be produced by preparing a substrate ultrafine barium sulfate particle by a known method, and treating the substrate with (1) a hydroxide and/or an oxide of at least one metallic element selected from the group consisting of Al, Si and Zr; and/or (2) a phosphate of at least one metallic element selected from the group consisting of Mg, Ca, Sr and Ba, to coat the substrate.

The way to prepare the substrate ultrafine barium sulfate particle is not particularly limited and the substrate may be prepared by any known method. For example, the following methods may be mentioned as such a known methods. The first example is a method comprising reacting an aqueous solution of sodium sulfate and an aqueous solution of barium sulfide (JP 47-31898, A). In the step of the reaction, a certain metaphosphate is added in the aqueous solution of sodium sulfate. The molar amount of sodium sulfate is stoichiometrically excess amount to the molar amount of barium sulfide. The second example is a method comprising reacting an aqueous solution containing barium sulfide with an aqueous solution of sulfuric acid in a condition such that the concentration of barium sulfide becomes constantly excess to the concentration of sulfuric acid (JP 57-51119, A and JP 57-145031, A). The condition may be made by continuously introducing the reaction mixture into a reaction vessel, such as a pump, and performing the reaction under stirring. The third example is a method comprising reacting an aqueous solution of barium sulfide and an aqueous solution of sulfuric acid in the presence of water-soluble alkali silicate (JP 58-120520, A). In the reaction, excess amount of barium sulfide is used to sulfuric acid. The forth example is a method comprising separately and simultaneously charging precisely stoichiometric quantities of an aqueous solution of sulfuric acid and an aqueous solution of a certain barium salt into an spraying apparatus to allow sulfuric acid to react with the barium salt, then concentrating medium with the generated precipitate, and spray-drying the condensate (JP 2-83211, A).

A commercially-available ultrafine barium sulfate particle may be used as the substrate. Examples of such a commercially-available ultrafine barium sulfate particle include BARIFINE BF-1, BARIFINE BF-10 and BARIFINE BF-20 (trade names, manufactured by Sakai Chemical Industry Co., Ltd.).

Subsequently, the substrate ultrafine barium sulfate particle is coated with the above component (1) and/or component (2). Target ultrafine barium sulfate particle of the present invention is thus obtained.

Various known methods may be employed for coating with the hydroxide and/or oxide (1) of one or more metallic elements selected from Al, Si, and Zr. For example, the ultrafine barium sulfate particle may be coated by adding an aqueous solution of water-soluble metallic compounds to aqueous slurry of barium sulfate, neutralizing the mixture with an alkaline or an acid according to the type of the above metallic compound, and depositing hydrous oxides of the above metal on the surface of barium sulfate, to coat the surface (JP 59-122553, A and JP 59-122554, A). The obtained particle may be further calcined.

The water-soluble compound is a water-soluble compound of metallic element selected from Al Si and Zr. The water-soluble compound is not limited as long as the compound forms hydroxide and/or oxide according to variation of pH. Preferable Al source is water-soluble aluminum salts, such as aluminum chloride, an aluminum nitrate, aluminum sulfate, and sodium aluminate. Preferable Si source is water-soluble silicates, such as sodium silicate and potassium silicate. Preferable Zr source is water-soluble zirconium salts, such as zirconium oxychloride, zirconium oxynitrate, and zirconium oxysulfate.

The acid used for neutralization is not particularly limited. Examples of the acid include sulfuric acid, hydrochloric acid and nitric acid. The alkali used for neutralization is not particularly limited. Examples of the alkali include sodium hydroxide, potassium hydroxide and aqueous ammonia. The neutralization may be performed at 20 to 80° C., and preferably may be performed over 15 to 240 minutes. The treated ultrafine barium sulfate may be isolated through a conventional post treatment, including filtration, washing with water, drying and pulverization.

The phosphate (2) of at least one metallic element selected from Mg, Ca, Sr and Ba may be coated on the particle by adding a water-soluble salt of at least one metallic element selected from Mg, Ca, Sr and Ba to aqueous slurry of the barium sulfate, and then adding a hydrogenphosphate compound. Examples of the water-soluble salt of the above metallic elements include chlorides and nitrates of Mg, Ca, Sr and Ba, hydroxides of Sr and Ba. Examples of the hydrogenphosphate compound include diammonium hydrogenphosphate and disodium hydrogenphosphate.

The ultrafine barium sulfate particle, on which each of the component (1) and/or the component (2) is sequentially coated, may be formed by repeating the above procedure for a plurality of times. Among the ultrafine barium sulfate particle, those coated with hydroxide or oxide of Si and Al, $BaHSO_4$, or $SrHPO_4$ are particularly preferred.

The amount of the component (1) and (2) on the particle surface is preferably 0.5 to 20% by mass based on the total mass of the substrate ultrafine barium sulfate particle and coated substances, as mentioned above. The amount may be controlled to be within such a range by adjusting the proportion of raw materials including the water-soluble metallic compounds, water-soluble salts of the metallic elements and hydrogenphosphate compounds to the ultrafine barium sulfate particle.

The water-borne coating composition of the present invention comprises the above ultrafine barium sulfate particle and a resin for water-borne coating compositions as essential components. In addition to these ingredients, the water-borne coating composition may further comprise various types of additives according to needs in various purposes or uses. Examples of such additives include dispersants, wetting agents, leveling agents, thixotropy-providing agents, thickeners, anti-sagging agents, antifungal agents, ultraviolet absorbers, film formation assistants, other organic solvents, and organic or inorganic pigments other than the above ultrafine barium sulfate particle.

The water-borne ink composition of the present invention comprises the above ultrafine barium sulfate particle and a resin for water-borne ink compositions as essential ingredients. The water-borne ink composition may further comprise other various additives according to needs in various purposes or uses. Examples of such additives include preservatives, antifungal agents, pH adjusters, rust-proofers, surfactants, other organic solvents, and organic or inorganic pigments other than the above ultrafine barium sulfate particle.

The water-borne coating composition and water-borne ink composition of the present invention each may be prepared in an ordinary method, by mixing water and the ultrafine barium sulfate particle, together with other ingredients, which are to be used as raw material, such as water-borne resins, to prepare aqueous dispersion.

The water-borne resins that are to be used in the coating composition may be any of water-borne resins commonly used in the field of the water-borne coating compositions, and are not particularly limited. Specific examples of water-borne film forming components, which may be used in the present invention, include components comprising base resins such as polyester, vinyl, acryl and urethane resins having crosslinkable functional group such as hydroxy, epoxy and carboxy; and crosslinking agents for curing by crosslinking, selected from melamine resins, urea resins, guanamine resins, unblocked or blocked polyisocyanate compounds, and epoxy compounds. The resins that are to be used in the water-borne ink composition may be any of water-borne resin commonly used in the field of the water-borne ink compositions, and are not particularly limited. Examples thereof include (styrene/acrylic acid) copolymer, (styrene/methacylic acid) copolymer, (acrylic acid/acrylic acid) copolymer, and (styrene/acrylic acid/acrylate) copolymer. In the present invention, these resins may be used alone, or may be used in a combination of two or more of them.

Normally, the water-borne coating composition or water-borne ink composition may comprise the above ultrafine barium sulfate particle in an appropriate amount according to purpose or use of water-borne coating compositions or water-borne ink compositions. For example, the amount of the ultrafine barium sulfate particle is preferably 0.3 to 200% by mass to 100% by mass of a water-borne resin. The amount is more preferably 0.7 to 150% by mass.

As mentioned above, the ultrafine barium sulfate particle of the present invention have high dispersibility, and high affinity for resins, which have been never observed in conventional ultrafine barium sulfate particles, when it is used in water-borne compositions such as water-borne coating compositions or water-borne ink compositions. The ultrafine barium sulfate particle of the present invention is excellent in transparency, color saturation and gloss, and improves orientation of in an aluminum flake or a pearl pigment.

BRIEF DESCRIPTION OF THE DRAWINGS

FIG. 3 is Table 2.

DETAILED DESCRIPTION OF THE INVENTION

Figure 1:
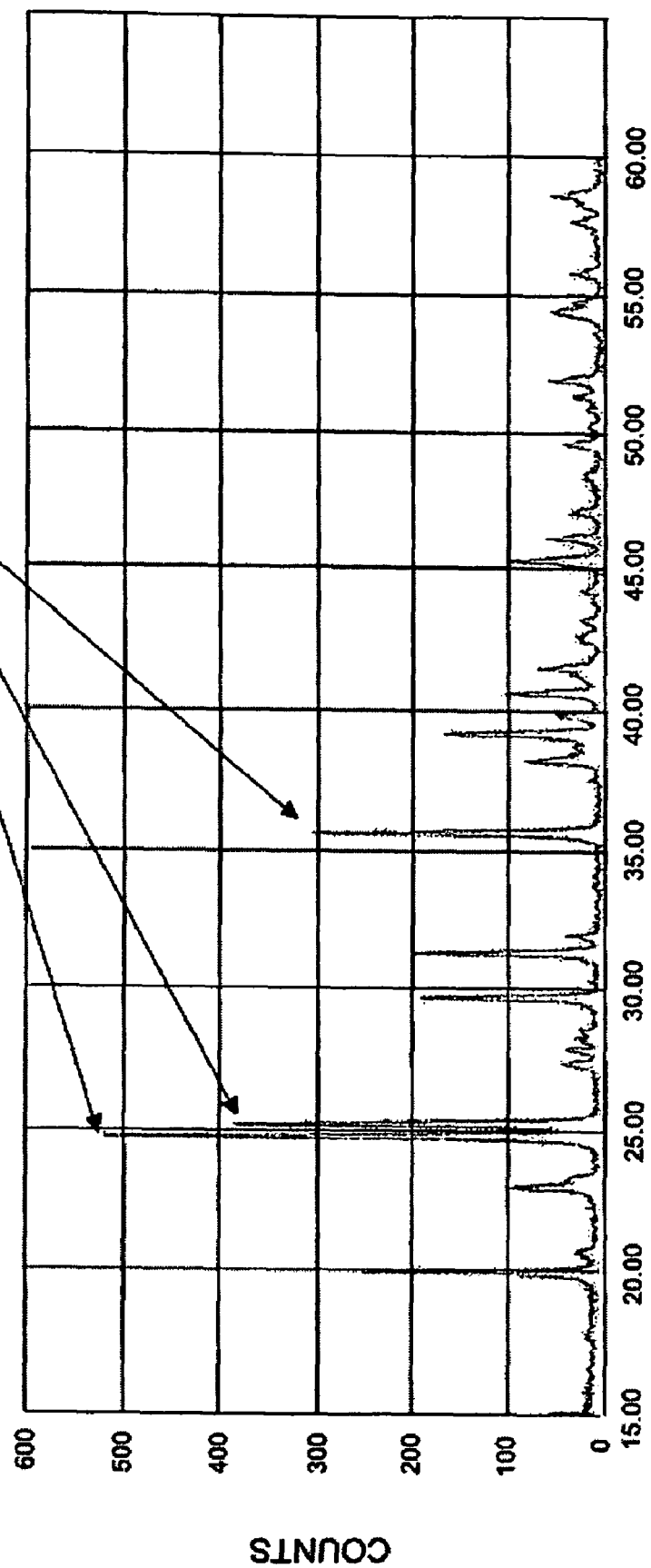
FIG. 1 is a diagram of X-ray diffraction of BaHPO4 produced in the condition of Example 4.

The present invention will be explained in more detail by illustrating Examples, but the present invention is not limited only to these Examples.

In the Examples, the unit "part(s)" means "part(s) by mass", and "%" means "% by mass", unless otherwise noted.

In the following examples, the amounts of Al components, Si components, and Zr components contained in coated substances were measured using an X-ray fluorescence device (X-ray fluorescence device system 3270, manufactured by Rigaku Corporation). The amount of P components was measured by a molybdenum blue method, after melting the coated substance with alkaline sodium carbonate under heating and separating P components as an aqueous solution.

The amounts of coated Al, Si and Zr are values calculated by converting the amounts of metallic compounds of Al components, Si components and Zr components into the amounts of corresponding oxides (namely, the amount of Al was determined as the amount of $Al_2O_3$, the amount of Si was determined as the amount of $SiO_2$, and the amount of Zr components was determined as $ZrO_2$). The amounts of coated phosphates of Mg, Ca, Sr and Ba are values calculated by converting the amount of measured P components into the amounts of phosphates represented by the general formula $MHPO_4$ (namely, the amounts of coated phosphates of Mg, Ca, Sr and Ba are determined as the amounts of $MgHPO_4$, $CaHPO_4$, $SrHPO_4$ and $BaHPO_4$).

Example 1

A Warman Pump (inlet diameter: 40 mm, outlet diameter: 25 mm, internal volume: 850 mL, impeller rotation speed: 2380 rpm) was used as a reaction vessel. An aqueous solution of sulfuric acid with a concentration of 110 g/L (1.1 mol/L), and a temperature of 30° C. was allowed to be sucked into this pump at a constant flow rate of 700 L/h. Simultaneously, a barium sulfide aqueous solution with a concentration of 120 g/L (0.71 mol/L) and a temperature of 50° C. was allowed to be sucked into the pump at a constant rate of 1180 L/h, to prepare 1000 mL of aqueous slurry (solid content: 95 g/L). The slurry was warmed to 70° C. Sodium silicate solution No. 3 in an amount corresponding to 4.0 g of $SiO_2$ was diluted with 100 mL of pure water, and the mixture was added dropwise to the slurry over 20 minutes. Then, sodium aluminate in an amount corresponding to 2.0 g of $Al_2O_3$ was diluted with 100 mL of pure water and added dropwise to the slurry over 20 minutes. After 10-minute stirring, the slurry was neutralized with diluted sulfuric acid to pH 8 over 30 minutes. After further 10-minute stirring, the slurry was filtrated. The separated cake was washed thoroughly with water, and dried to give dried chips. The chips were crushed roughly, and then pulverized with an air current pulveizer. On the surface of the obtained powder, Si components corresponding to 3.5% by mass of $SiO_2$, and Al component corresponding to 1.7% by mass of $Al_2O_3$ (based on the total amount of substrate ultrafine barium sulfate particles and coated substances) were coated. The number average primary particle diameter of the obtained ultrafine barium sulfate particles was 0.05 μm, as the number average value of a unidirectional particle diameter determined from a transmission electron micrograph.

The number average primary particle diameter of an unidirectional particle diameter determined from a transmission electron micrograph was determined by taking 100,000× magnification transmission electron micrographs of random 300 sample particles with a transmission electron microscope, then measuring the unidirectional diameter of each particle, and calculating the average value of the diameters of the 300 particles. The same method were used in the below Examples and Comparative examples for determining the number average primary particle diameter of a unidirectional particle diameter.

Example 2

1000 mL of aqueous slurry of ultrafine barium sulfate particles (solid content: 95 g/L), prepared in the same manner as Example 1, was warmed to 70° C. Sodium silicate solution No. 3 in an amount corresponding to 11.2 g of $SiO_2$ was diluted with 100 mL of pure water to give a mixture, and then added to the slurry over 20 minutes. Then, sodium aluminate in an amount corresponding to 5.6 g of $Al_2O_3$ was diluted with 100 mL of pure water to give a mixture, and then the mixture was added to the slurry over 20 minutes. After 10-minute stirring, the slurry was neutralized with diluted sulfuric acid to pH 8 over 30 minutes. After further 10-minute stirring, the slurry was cooled, milled with medium, and filtrated. The separated cake was washed thoroughly with water, and dried to give dried chips. The chips were crushed roughly, and then pulverized with an air current pulverizer. On the surface of the obtained powder, Si components corresponding to 9.3% by mass of $SiO_2$, and Al component corresponding to 4.4% by mass of $Al_2O_3$ (based on the total amount of substrate ultrafine barium sulfate particles and coated substances) were coated. The number average primary particle diameter of the obtained ultrafine barium sulfate particles was 0.05 μm, as the number average value of a unidirectional particle diameter determined from a transmission electron micrograph.

Example 3

1000 mL of aqueous slurry of ultrafine barium sulfate particles (solid content: 95 g/L), prepared in the same manner as Example 1, was warmed to 70° C. Sodium silicate solution No. 3 in an amount corresponding to 4.0 g of $SiO_2$ was diluted with 100 mL of pure water to give a mixture, and then added to the slurry over 20 minutes. After 10-minute stirring, the slurry was neutralized with diluted sulfuric acid to pH 8 over 30 minutes. Then, sodium aluminate in an amount corresponding to 2.0 g of $Al_2O_3$ was diluted with 100 mL of pure water to give a mixture, and then the mixture was added to the slurry over 20 minutes. After 10-minute stirring, the slurry was neutralized with diluted sulfuric acid to pH 8 over 30 minutes. After further 10-minute stirring, the slurry was filtrated. The separated cake was washed thoroughly with water, and dried to give dried chips. The chips were crushed roughly, and then pulverized with an air current pulverizer.

On the surface of the obtained powder, Si components corresponding to 3.4% by mass of $SiO_2$, and Al component corresponding to 1.7% by mass of $Al_2O_3$ (based on the total amount of substrate ultrafine barium sulfate particles and coated substances) were coated. The number average primary particle diameter of the obtained ultrafine barium sulfate particles was 0.05 μm, as the number average value of a unidirectional particle diameter determined from a transmission electron micrograph.

Example 4

1000 mL of aqueous slurry of ultrafine barium sulfate particles (solid content: 95 g/L), prepared in the same manner as Example 1, was warmed to 70° C. 2.0 g of barium chloride dihydrate was added to the slurry. Then, 1.2 g of diammonium hydrogenphosphate was dissolved in pure water, and the solution was added to the slurry over 20 minutes. After 10-minute stirring, the slurry was filtrated. The separated cake was washed thoroughly with water, and dried to give dried chips. The chips were crushed roughly, and then pulverized with an air current pulverizer. On the surface of the obtained powder, Ba components corresponding to 1.7% by mass of $BaHPO_4$ (based on the total amount of substrate ultrafine barium sulfate particles and coated substances) were coated. The number average primary particle diameter of the obtained ultrafine barium sulfate particles was 0.05 μm, as the number average value of a unidirectional particle diameter determined from a transmission electron micrograph.

Example 5

1000 mL of aqueous slurry of ultrafine barium sulfate particles (solid content: 95 g/L), prepared in the same manner as Example 1, was warmed to 70° C. The pH of the slurry was adjusted to 12 with sodium hydroxide, and then 2.0 g of barium chloride dihydrate was added to the slurry. Then, 1.2 g of diammonium hydrogenphosphate was dissolved in pure water, and the solution was added to the slurry over 20 minutes. After 10-minute stirring, the slurry was filtrated. The separated cake was washed thoroughly with water, and dried to give dried chips. The chips were crushed roughly, and then pulverized with an air current pulverizer. On the surface of the obtained powder, Ba components corresponding to 1.3% by mass of $BaHPO_4$ (based on the total amount of substrate ultrafine barium sulfate particles and coated substances) were coated. The number average primary particle diameter of the obtained ultrafine barium sulfate particles was 0.05 μm, as the number average value of a unidirectional particle diameter determined from a transmission electron micrograph.

Example 6

1000 mL of aqueous slurry of ultrafine barium sulfate particles (solid content: 95 g/L), prepared in the same manner as Example 1, was warmed to 70° C. 2.6 g of magnesium chloride hexahydrate was added to the slurry. Then, 1.8 g of diammonium hydrogenphosphate was dissolved in pure water, and the solution was added to the slurry over 20 minutes. After 10-minute stirring, the slurry was filtrated. The separated cake was washed thoroughly with water, and dried to give dried chips. The chips were crushed roughly, and then pulverized with an air current pulverizer. On the surface of the obtained powder, Mg components corresponding to 1.2% by mass of $MgHPO_4$ (based on the total amount of substrate ultrafine barium sulfate particles and coated substances) were coated. The number average primary particle diameter of the obtained ultrafine barium sulfate particles was 0.05 μm, as the number average value of a unidirectional particle diameter determined from a transmission electron micrograph.

Example 7

1000 mL of aqueous slurry of ultrafine barium sulfate particles (solid content: 95 g/L), prepared in the same manner as Example 1, was warmed to 70° C. 1.8 g of calcium chloride dihydrate was added to the slurry. Then, 1.6 g of diammonium hydrogenphosphate was dissolved in pure water, and the solution was added to the slurry over 20 minutes. After 10-minute stirring, the slurry was filtrated. The separated cake was washed thoroughly with water, and dried to give dried chips.

The chips were crushed roughly, and then pulverized with an air current pulverizer. On the surface of the obtained powder, Ca components corresponding to 1.3% by mass of $CaHPO_4$ (based on the total amount of substrate ultrafine barium sulfate particles and coated substances) were coated. The number average primary particle diameter of the obtained ultrafine barium sulfate particles was 0.05 μm, as the number average value of a unidirectional particle diameter determined from a transmission electron micrograph.

Example 8

1000 mL of aqueous slurry of ultrafine barium sulfate particles (solid content: 95 g/L), prepared in the same manner as Example 1, was warmed to 70° C. 2.2 g of strontium chloride hexahydrate was added to the slurry. Then, 1.1 g of diammonium hydrogenphosphate was dissolved in pure water, and the solution was added to the slurry over 20 minutes. After 10-minute stirring, the slurry was filtered. The separated cake was washed thoroughly with water, and dried to give dried chips. The chips were crushed roughly, and then pulverized with an air current pulverizer. On the surface of the obtained powder, Sr components corresponding to 1.2% by mass of $SrHPO_4$ (based on the total amount of substrate ultrafine barium sulfate particles and coated substances) were coated. The number average primary particle diameter of the obtained ultrafine barium sulfate particles was 0.05 μm, as the number average value of a unidirectional particle diameter determined from a transmission electron micrograph.

Example 9

1000 mL of aqueous slurry of ultrafine barium sulfate particles (solid content: 95 g/L), prepared in the same manner as Example 1, were warmed to 70° C. Sodium silicate solution No. 3 in an amount corresponding to 7.2 g of $SiO_2$ was diluted with 100 mL of pure water, and added dropwise to the slurry over 20 minutes. After 10-minute stirring, the slurry was neutralized with diluted sulfuric acid to pH 8 over 30 minutes. After further 10-minute stirring, the slurry was cooled, milled with medium, and filtered. The separated cake was washed thoroughly with water, and dried to give dried chips. The chips were crushed roughly, and then pulverized with an air current pulverizer. On the surface of the obtained powder, Si components corresponding to 6.1% by mass of $SiO_2$ (based on the total amount of substrate ultrafine barium sulfate particles and coated substances) were coated. The number average primary particle diameter of the obtained ultrafine barium sulfate particles was 0.05 μm, as the number average value of a unidirectional particle diameter determined from a transmission electron micrograph.

Example 10

1000 mL of aqueous slurry of ultrafine barium sulfate particles (solid content: 95 g/L), prepared in the same manner as Example 1, was warmed to 70° C. Zirconium oxychloride in an amount corresponding to 4.0 g of $ZrO_2$ was diluted with 50 mL of pure water, and added dropwise to the slurry over 20 minutes. Then, sodium aluminate in an amount corresponding to 2.0 g of $Al_2O_3$ was diluted with 100 mL of pure water to give a mixture, and then the mixture was added to the slurry over 20 minutes. After 10-minute stirring, the slurry was neutralized with diluted sulfuric acid to pH 8 over 30 minutes. After further 10-minute stirring, the slurry was filtered. The separated cake was washed thoroughly with water, and dried to give dried chips. The chips were crushed roughly, and then pulverized with an air current pulverizer. On the surface of the obtained powder, Zr components corresponding to 3.4% by mass of $ZrO_2$, and Al component corresponding to 1.6% by mass of $Al_2O_3$ (based on the total amount of substrate ultrafine barium sulfate particles and coated substances) were coated. The number average primary particle diameter of the obtained ultrafine barium sulfate particles was 0.05 μm, as the number average value of a unidirectional particle diameter determined from a transmission electron micrograph.

Example 11

1000 mL of aqueous slurry of ultrafine barium sulfate particles (solid content: 95 g/L), prepared in the same manner as Example 1, was warmed to 70° C. Zirconium oxychloride in an amount corresponding to 5.0 g of $ZrO_2$ was diluted with 100 mL of pure water, and added dropwise to the slurry over 20 minutes. After 10-minute stirring, the slurry was neutralized with 5% NaOH to pH 8 over 30 minutes. After further 10-minute stirring, the slurry was cooled, milled with medium, and filtrated. The separated cake was washed thoroughly with water, and dried to give dried chips. The chips were crushed roughly, and then pulverized with an air current pulverizer. On the surface of the obtained powder, Zr components corresponding to 4.5% by mass of $ZrO_2$ (based on the total amount of substrate ultrafine barium sulfate particles and coated substances) were coated. The number average primary particle diameter of the obtained ultrafine barium sulfate particles was 0.05 μm, as the number average value of a unidirectional particle diameter determined from a transmission electron micrograph.

Example 12

1000 mL of aqueous slurry of ultrafine barium sulfate particles (solid content: 95 g/L), prepared in the same manner as Example 1, was warmed to 70° C. Sodium aluminate solution in an amount corresponding to 2.9 g of $Al_2O_3$ was diluted with 100 mL of pure water, and added dropwise to the slurry over 20 minutes. After 10-minute stirring, the slurry was neutralized with diluted sulfuric acid to pH 8 over 30 minutes. After further 10-minute stirring, the slurry was cooled, milled with medium, and filtrated. The separated cake was washed thoroughly with water, and dried to give dried chips. The chips were crushed roughly, and then pulverized with an air current pulverizer. On the surface of the obtained powder, Al components corresponding to 2.4% by mass of $Al_2O_3$ (based on the total amount of substrate ultrafine barium sulfate particles and coated substances) were coated. The number average primary particle diameter of the obtained ultrafine barium sulfate particles was 0.05 μm, as the number average value of a unidirectional particle diameter determined from a transmission electron micrograph.

Dispersibility in water and resin adsorpability of the ultrafine barium sulfate particles prepared in Examples 1 to 12, and a commercial ultrafine barium sulfate particle (BARIFINE BF-20; Sakai Chemical Industry Co., Ltd.) were evaluated by the methods explained below. The results are illustrated in Table 1.

[Dispersibility in Water]

10 parts by mass of each sample were dispersed in 40 parts by mass of distilled water by ultrasonication. Sedimentation of the obtained mixture was evaluated as the following criteria:

+++: Dispersibility was very good.
++: Dispersibility was good.

+: Dispersibility was average.
−: Dispersibility was poor.

[Resin Adsorpability]

50 parts by mass of each sample were dispersed in a mixture of 35.8 parts by mass of a melamine resin (Setamine MS-152 IB-70, manufactured by Akzo Nobel), 39.6 parts by mass of a polyester resin (Setal 6306 SS-60, manufactured by Akzo Nobel), 140 parts by mass of distilled water, and 27.4 parts by mass of propylene glycol. The obtained dispersion was centrifuged, then supernatant was removed, and sediment was diluted. This series of operations including centrifugal sedimentation, supernatant removal and dilution of sediment was repeated three times, to give sediment. The obtained sediment was filtrated, and dried. Ignition loss of dried sediment was determined. The amount of resins adsorbed to particles was calculated based on the ignition loss for evaluating resin adsorpability of each sample.

The below evaluation criteria are based on the amount of adsorbed resins per 100 g of pigments.
+++: 20 g or more; Resin adsorpability was very good.
++: 15 g or more, but less than 20 g; Resin adsorpability was good.
+: 10 g or more but less than 15 g; Resin adsorpability was average.
−: Less than 10 g; Resin adsorpability was bad.

TABLE 1

| | Dispersibility in water | Resin adsorpability |
|---|---|---|
| Ex. 1 | ++ | + |
| Ex. 2 | + | ++ |
| Ex. 3 | ++ | + |
| Ex. 4 | + | +++ |
| Ex. 5 | + | +++ |
| Ex. 6 | + | ++ |
| Ex. 7 | + | ++ |
| Ex. 8 | + | +++ |
| Ex. 9 | +++ | − |
| Ex. 10 | − | +++ |
| Ex. 11 | − | ++ |
| Ex. 12 | − | +++ |
| BF-20 | − | − |

As illustrated in Table 1, ultrafine barium sulfate particles obtained in Examples 1 to 12 had practically sufficient dispersibility in water and/or resin adsorpability. On the other hand, BARIFINE BF-20 was inferior in both water dispersibility and resin adsorbent.

Examples 13 to 21

Water-Borne Coating Compositions

In a mixture of 35.8 parts by mass of a melamine resin (Setamine MS-152 IB-70, manufactured by Akzo Nobel), 39.6 parts by mass of a polyester resin (Setal 6306 SS-60, manufactured by Akzo Nobel), 140 parts by mass of distilled water, 27.4 parts by mass of propylene glycol and 1.4 parts by mass of dimethylethanolamine, 50 parts by mass of the ultrafine barium sulfate particle each prepared by the methods of Examples 1 to 9 was mixed and dispersed. Then, 213.4 parts by mass of an acrylic resin (Setalux 6802 AQ-24, manufactured by Akzo Nobel) was mixed in the obtained dispersion to give a water-borne coating composition. pH of the coating composition was adjusted to 7.9 just after the preparation of the coating composition, and then still stood for 16 hours. pH of the coating composition was adjusted again to 7.8 to 8.0 just before applying the composition.

Comparative Example 1

Water-Borne Coating Composition

The same procedure as Example 13 was performed except that 50 parts by mass of ultrafine barium sulfate particle (BARIFINE BF-20, manufactured by Sakai Chemical Industry Co., Ltd.), whose surface was untreated, was used in lieu of 50 parts by mass of ultrafine barium sulfate particle prepared in Example 1, to produce a water-borne coating composition. pH of the coating composition was adjusted to 7.9 just after the preparation of the coating composition, and then still stood for 16 hours. pH of the coating composition was adjusted again to 7.8 to 8.0 just before applying the coating composition.

Examples 22 to 24

Water-Borne Coating Compositions

In a mixture of 28.4 parts by mass of a melamine resin (Setamine MS-152 IB-70, manufactured by Akzo Nobel), 31.6 parts by mass of a polyester resin (Setal 6306 SS-60, manufactured by Akzo Nobel), 186.2 parts by mass of distilled water, 47.2 parts by mass of butyl cellosolve and 1.4 parts by mass of dimethylethanolamine, 50 parts by mass of the ultrafine barium sulfate particle each prepared by the methods of Examples 10 to 12 were mixed and dispersed. Then, 254.6 parts by mass of an acrylic resin (Setalx 6802 AQ-24, manufactured by Akzo Nobel) was mixed in the obtained dispersion to give a water-borne coating composition. pH of the coating composition was adjusted to 7.9 just after the preparation of the coating composition, and then still stood for 16 hours. pH of the coating composition was adjusted again to 7.8 to 8.0 just before applying the composition.

Comparative Example 2

Water-Borne Coating Composition

The same procedure as Example 22 was performed except that 50 parts by mass of ultrafine barium sulfate particle (BARIFINE BF-20, manufactured by Sakai Chemical Industry Co., Ltd.), whose surface was untreated, was used in lieu of 50 parts by mass of ultrafine barium sulfate particle prepared in Example 10, to produce a water-borne coating composition. pH of the coating composition was adjusted to 7.9 just after the preparation of the coating composition, and then still stood for 16 hours. pH of the coating composition was adjusted again to 7.8 to 8.0 just before applying the coating composition.

Examples 25 to 27 and 33

Water-Borne Coating Composition

In a mixture of 35.8 parts by mass of a melamine resin (Setamine MS-152 IB-70, manufactured by Akzo Nobel), 39.6 parts by mass of a polyester resin (Setal 6306 SS-60, manufactured by Akzo Nobel), 140 parts by mass of distilled water, 27.4 parts by mass of propylene glycol and 1.4 parts by mass of dimethylethanolamine, 6 parts by mass of a black pigment (carbon black MA-100B, manufactured by Mitsubishi Chemical Corporation) and 6 parts by mass of the ultrafine barium sulfate particle each prepared by the methods of Examples 1 to 3 and 9 were mixed and dispersed. Then, 213.4 parts by mass of an acrylic resin (Setalux 6802 AQ-24, manufactured by Akzo Nobel) was mixed in the obtained dispersion to give a black water-borne coating composition. pH of the coating composition was adjusted to 7.9 just after the preparation of the coating composition, and then still stood for 16 hours. pH of the coating composition was adjusted again to 7.8 to 8.0 just before applying the coating composition.

Comparative Example 3

Water-Borne Coating Composition

The same procedure as Example 25 was performed except that 6 parts by mass of ultrafine barium sulfate particle (BARIFINE BF-20, manufactured by Sakai Chemical Industry Co., Ltd.), whose surface was untreated, was used in lieu of 6 parts by mass of ultrafine barium sulfate particle prepared in Example 1, to produce a black water-borne coating composition. pH of the coating composition was adjusted to 7.9 just after the preparation of the coating composition, and then still stood for 16 hours. pH of the coating composition was adjusted again to 7.8 to 8.0 just before applying the coating composition.

Comparative Example 4

Water-Borne Coating Composition

The same procedure as Example 25 was performed except that ultrafine barium sulfate particle was not used, to produce a black water-borne coating composition. pH of the coating composition was adjusted to 7.9 just after the preparation of the coating composition, and then still stood for 16 hours. pH of the coating composition was adjusted again to 7.8 to 8.0 just before applying the coating composition.

Examples 28 to 32

Water-Borne Coating Composition

In a mixture of 35.8 parts by mass of a melamine resin (Setamine MS-152 IB-70, manufactured by Akzo Nobel), 39.6 parts by mass of a polyester resin (Setal 6306 SS-60, manufactured by Akzo Nobel), 140 parts by mass of distilled water, 27.4 parts by mass of propylene glycol and 1.4 parts by mass of dimethylethanolamine, 20 parts by mass of a red pigment (CINQUASIA red Y, manufactured by DuPont) and 20 parts by mass of the ultrafine barium sulfate particle each prepared by the methods of Examples 4 to 8 were mixed and dispersed. Then, 213.4 parts by mass of an acrylic resin (Setalux 6802 AQ-24, manufactured by Akzo Nobel) was mixed in the obtained dispersion to give a red water-borne coating composition. pH of the coating composition was adjusted to 7.9 just after the preparation of the coating composition, and then still stood for 16 hours. pH of the coating composition was adjusted again to 7.8 to 8.0 just before applying the coating composition.

Comparative Example 5

Water-Borne Coating Composition

The same procedure as Example 28 was performed except that 20 parts by mass of ultrafine barium sulfate particle (BARIFINE BF-20, manufactured by Sakai Chemical Industry Co., Ltd.), whose surface was untreated, was used in lieu of 20 parts by mass of ultrafine barium sulfate particle prepared in Example 4, to produce a red water-borne coating composition. pH of the coating composition was adjusted to 7.9 just after the preparation of the coating composition, and then still stood for 16 hours. pH of the coating composition was adjusted again to 7.8 to 8.0 just before applying the coating composition.

Comparative Example 6

Water-Borne Coating Composition

The same procedure as Example 28 was performed except that ultrafine barium sulfate particle was not used, to produce a red water-borne coating composition. pH of the coating composition was adjusted to 7.9 just after the preparation of the coating composition, and then still stood for 16 hours. pH of the coating composition was adjusted again to 7.8 to 8.0 just before applying the coating composition.

Examples 34 to 36

Water-Borne Coating Composition

In a mixture of 28.4 parts by mass of a melamine resin (Setamine MS-152 IB-70, manufactured by Akzo Nobel), 31.6 parts by mass of a polyester resin (Setal 6306 SS-60, manufactured by Akzo Nobel), 186.2 parts by mass of distilled water, 47.2 parts by mass of butyl cellosolve and 1.4 parts by mass of dimethylethanolamine, 6 parts by mass of a black pigment (carbon black MA-100B, manufactured by Mitsubishi Chemical Corporation) and 6 parts by mass of the ultrafine barium sulfate particle each prepared by the methods of Examples 10 to 12 were mixed and dispersed. Then, 254.6 parts by mass of an acrylic resin (Setalux 6802 AQ-24, manufactured by Akzo Nobel) was mixed in the obtained dispersion to give a water-borne coating composition. pH of the coating composition was adjusted to 7.9 just after the preparation of the coating composition, and then still stood for 16 hours. pH of the coating composition was adjusted again to 7.8 to 8.0 just before applying the coating composition.

Comparative Example 7

Water-Borne Coating Composition

The same procedure as Example 34 was performed except that 6 parts by mass of ultrafine barium sulfate particle (BARIFINE BF-20, manufactured by Sakai Chemical Industry Co., Ltd.), whose surface was untreated, was used in lieu of 6 parts by mass of ultrafine barium sulfate particle prepared in Example 10, to produce a black water-borne coating composition. pH of the coating composition was adjusted to 7.9 just after the preparation of the coating composition, and then still stood for 16 hours. pH of the coating composition was adjusted again to 7.8 to 8.0 just before applying the coating composition.

Comparative Example 8

Water-Borne Coating Composition

The same procedure as Example 34 was performed except that ultrafine barium sulfate particle was not used, to produce a black water-borne coating composition. pH of the coating composition was adjusted to 7.9 just after the preparation of the coating composition, and then still stood for 16 hours. pH of the coating composition was adjusted again to 7.8 to 8.0 just before applying the coating composition.

Using the water-borne coating compositions obtained in Examples 13 to 36 and comparative examples 1 to 8, coated films were formed, and 20°-20° specular gloss of the coated films was measured. The water-borne coating compositions obtained in Examples 13 to 24, and Comparative Examples 1 and 2 were applied on a glass plate to form coated films. Using a color meter, light was irradiated perpendicularly to the plate and L value of the Hunter system was measured from transmitted light at the coated portion and uncoated portion (raw glass portion). Transparency of a coat was calculated by the following formula:

(Transparency)=($L$ value of coated portion/$L$ value of uncoated portion(raw glass portion))×100

For the coating compositions of Examples 25 to 36 and comparative examples 3 to 8, L value, a value, and b value according to the Hunter system were measured. The results are summarized in Table 2.

According to the results of Table 2, the water-borne coating compositions that contained the ultrafine barium sulfate particle of the present invention showed more improved gloss than those contain conventional ultrafine barium sulfate particle, when comparing water-borne coating compositions containing the same kind and the same amount of pigments and resins each other. In pigment-free compositions, transparency was improved in water-borne coating compositions containing the ultrafine barium sulfate particle of the present invention. The red water-borne coating composition that contained the ultrafine barium sulfate particle of the present invention had higher a value. The higher a values indicates that clearness of color was improved. The black water-borne coating composition containing the ultrafine barium sulfate particle of the present invention had lower L value. The lower L value indicates that jet blackness was improved.

Preparation of Testing Plates Coated with Water-Borne Compositions

On a 3-mm-thick glass plate, a water-borne composition was coated by a 6-mil applicator. The obtained coated film was baked at 80° C. for 8 minutes, and used for a test.

Example 37

Water-Borne Ink Composition 20 part by mass of a water-borne resin (manufactured by Johnson polymer, JONCRYL 683), 2 parts by mass of sodium hydroxide and 78 parts by mass of ion-exchanged water were mixed and stirred under heating, to prepare a resin solution. Then, 30 parts by mass of the resin solution, 20 part by mass of a black pigment (Mitsubishi Chemical Corporation, carbon black MA-100B), 20 parts by mass of the ultrafine barium sulfate particles prepared by the method of Example 1, 30 parts of ethylene glycol, and 45 parts by mass of ion-exchanged water were mixed and stirred. Dispersion of the obtained mixture by a beads mill gave water-borne black pigment dispersion. To 44 parts by mass of this water-borne pigment dispersion, 0.6 parts by mass of a phosphate surfactant (Phosphanol PE-510, manufactured by Toho Chemical Industry, Co., Ltd.), 10 parts by mass of glycerol, 15 parts by mass of urea, 30.2 parts by mass of ion-exchanged water, 0.1 parts by mass of a fungicide (Coatcide H, Takeda Pharmaceutical Co., Ltd.) and 0.1 parts by mass of a preservative (Proxel XL-2, manufactured by Avecia Biologics Limited) were added, and mixed and stirred. Then, the mixture was centrifuged, large particles were removed, to produce a water-borne ink composition. On a 3-mm-thick glass plate, the water-borne ink composition was coated by a 6-mil applicator. The plate was dried at 80° C. Thus, ink film was obtained.

Comparative Example 9

Water-Borne Ink Composition

The same procedure as Example 37 was performed except that ultrafine barium sulfate particle was not used, to produce a water-borne ink composition. On a 3-mm-thick glass plate, the water-borne ink composition was coated by a 6-mil applicator. The plate was dried at 80° C. Thus, ink film was obtained.

Using the water-borne ink compositions obtained in Example 37 and comparative examples 9, ink films were formed, and 20°-20° specular gloss of the coats was measured. L value of the Hunter system of each ink coat was measured using a color meter, and color tone of the ink coats was evaluated. The results are summarized in Table 2.

Figure 2:
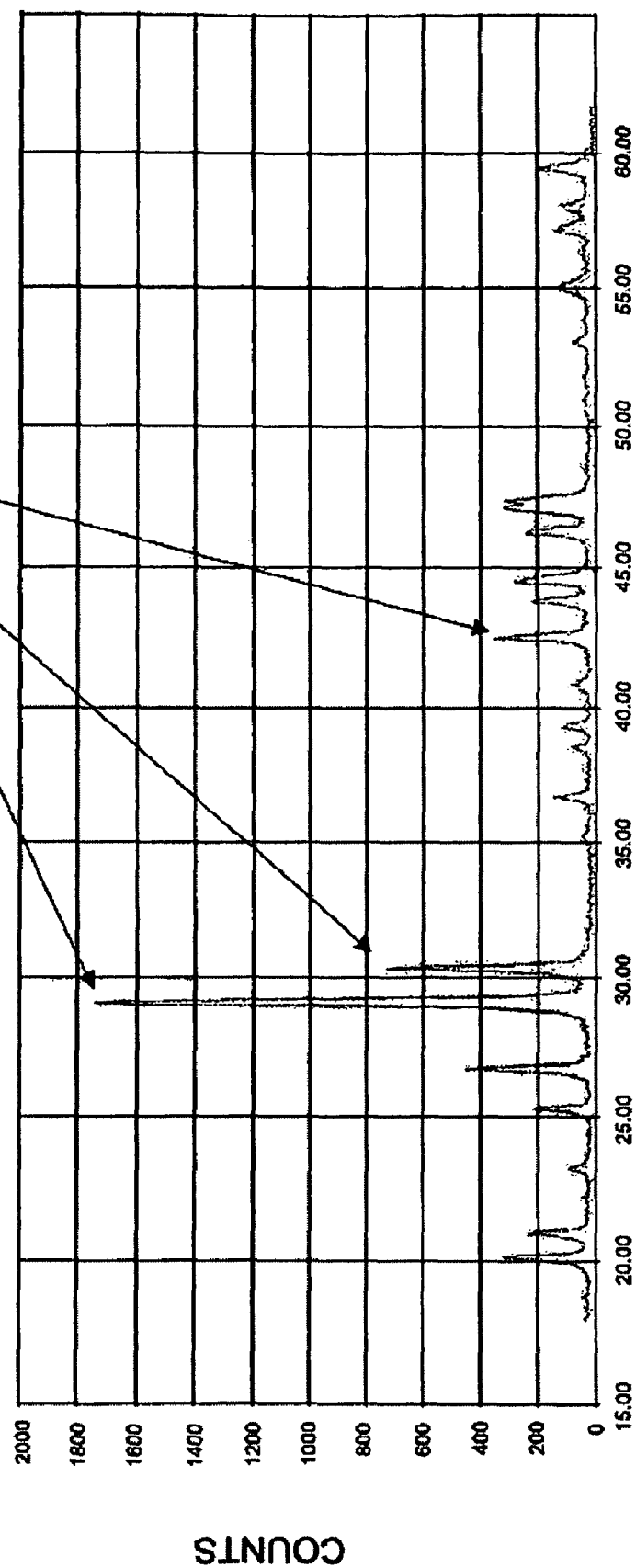
FIG. 2 is a diagram of X-ray diffraction of Ba5(PO4)3OH produced in the condition of Example 5.

According to the results of Table 2, the water-borne ink compositions that contained the ultrafine barium sulfate particle of the present invention showed more improved gloss than those contain conventional ultrafine barium sulfate particle, when comparing water-borne ink compositions containing the same kind and the same amount of pigments and resins each other. The water-borne ink composition that contained the ultrafine barium sulfate particle of the present invention had lower L value. The lower L value indicates that jet blackness was improved.-ray diffraction measurement. The x-ray diffraction patterns for the phosphates produced in the conditions in Examples 4 and 5 are shown in FIGS. 1 and 2, respectively. Each x-ray diffraction spectrum was determined with a copper tube. In FIGS. 1 and 2 the characteristic peaks for $BaHPO_4$ according to inorganic index to the powder diffraction file are designated "d". The diffraction patterns each showed that $BaHPO_4$ and $Ba_5(PO_4)_3OH$ were respectively obtained. It is apparent from this result that phosphates of the metallic element expressed with $MHPO_4$ and $M_5(PO_4)_3OH$ were coated on the ultrafine barium sulfate particle of the present invention.

The ultrafine barium sulfate particle of the present invention maintains transparency even if it is mixed in a water-borne composition. The particle improves color saturation, gloss, and orientation. The ultrafine barium sulfate particle is suitable for water-borne compositions such as a water-borne coating composition and a water-borne ink composition.

The invention claimed is:

1. A barium sulfate particle, comprising:
   barium sulfate; and
   a phosphate of at least one metallic element selected from the group consisting of Mg, Ca, Sr and Ba;
   the barium sulfate being coated with the phosphate.

2. The barium sulfate particle according to claim 1, wherein the amount of the phosphate coated on the barium sulfate is 0.5 to 20% by mass based on the total mass of the barium sulfate particle including the barium sulfate and the phosphate.

3. A water-borne coating composition comprising the barium sulfate particle according to claim 1.

4. A water-borne ink composition comprising the barium sulfate particle according to claim 1.

5. The barium sulfate particle according to claim 1 or 2, wherein a number average primary particle diameter of the barium sulfate particle is 0.1 μm or smaller.

* * * * *